UNITED STATES PATENT OFFICE.

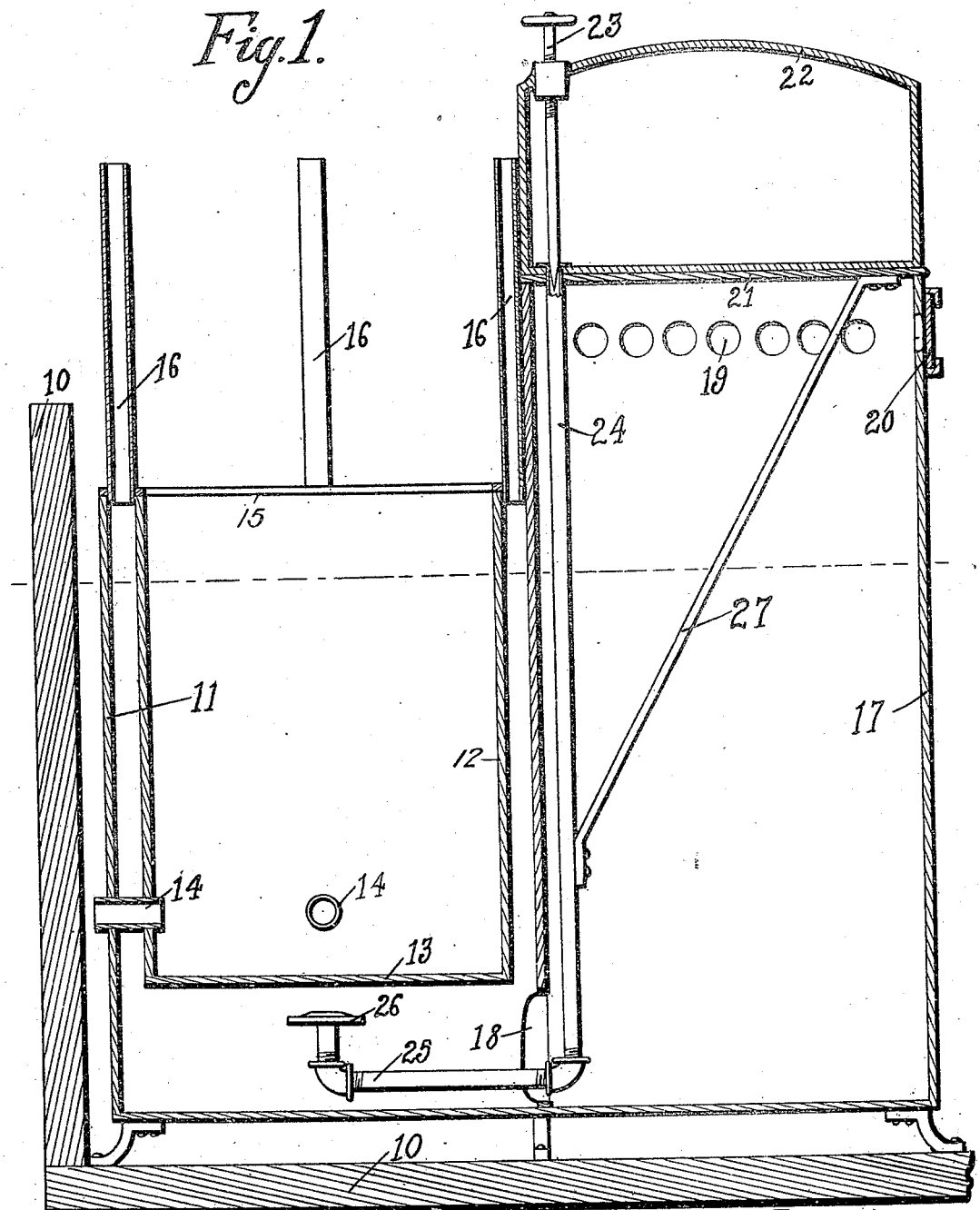

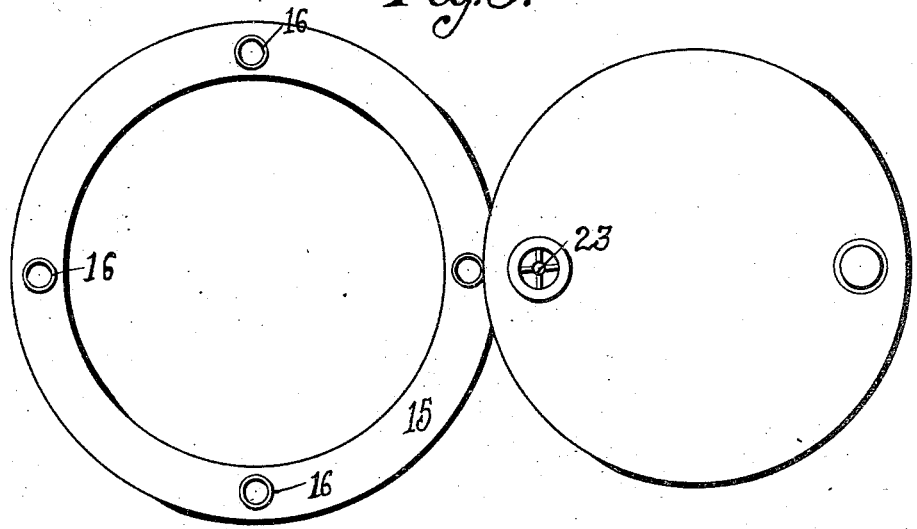
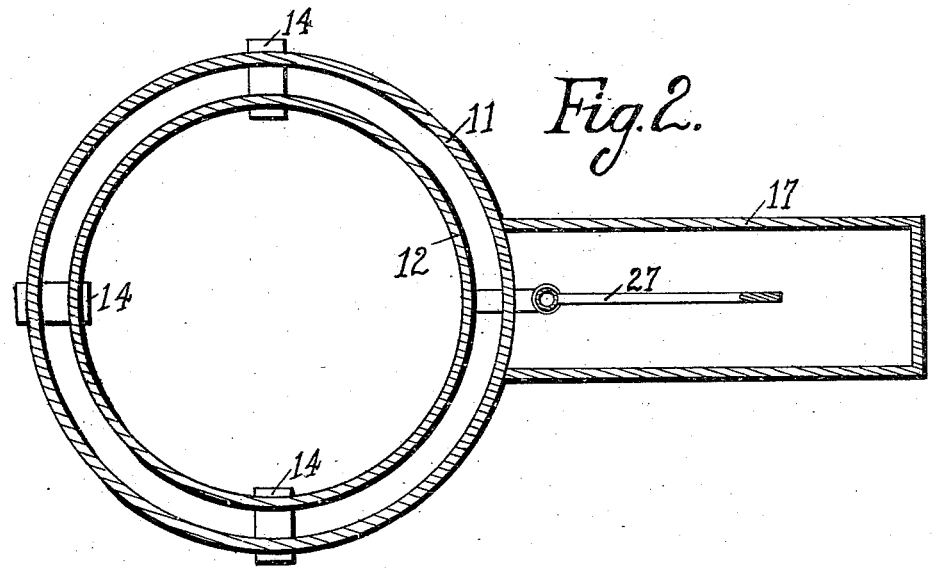

HAL SCOTT AND RICHARD M. BOYER, OF OSKALOOSA, IOWA.

TANK-HEATER.

951,428.  Specification of Letters Patent.  Patented Mar. 8, 1910.

Application filed May 19, 1909. Serial No. 496,964.

*To all whom it may concern:*

Be it known that we, HAL SCOTT and RICHARD M. BOYER, citizens of the United States, residing at Oskaloosa, in the county of Mahaska and State of Iowa, have invented a certain new and useful Tank-Heater, of which the following is a specification.

The object of our invention is to provide a heater for water tanks which heater is designed to be placed in the water tank and resting on the bottom thereof, and which is provided with a gasolene burner which is so arranged and constructed that it may be quickly and easily removed from the heater tank and lighted and then may be replaced while burning in the heater tank under water to thereby heat the water in the tank.

A further object is to provide a device of this kind in which the flame of the burner may be regulated without removing the burner from the heater tank.

A further object is to provide a tank heater of simple, durable and inexpensive construction, and of comparatively small size, that will burn for a comparatively long time without any attention on the part of the operator.

Our invention consists in the construction, arrangement, and combination of the various parts of the device whereby the objects contemplated are attained, as hereinafter more fully set forth, pointed out in our claims, and illustrated in the accompanying drawings, in which—

Figure 1 shows a vertical, central, sectional view of a tank heater embodying our invention. Fig. 2 shows a horizontal, sectional view on the dotted line shown in Fig. 1, and Fig. 3 shows a top or plan view of the tank heater embodying our invention.

Referring to the accompanying drawings, we have used the reference numeral 10 to indicate that portion of the water tank shown.

Our improved heater comprises an outer wall 11 open at its top and closed at its bottom and a water receptacle 12 arranged within the outer wall 11 and spaced apart from it and also having a closed bottom 13 spaced apart from the bottom of the outer wall 11. The said water receptacle 12 is supported in position by means of a series of tubes 14 open at both ends and extended through both the outer wall 11 and the water receptacle 12, near the bottom of the latter. At the top of the outer wall 11 and the water receptacle 12 is an annular cover 15 connected with their upper edges to close the space between them. Mounted in this cover 15 is a series of ventilating tubes 16 extending upwardly to a point above the tank to permit the burned gases from between the outer wall 11 and the water receptacle 12 to pass upwardly to a point of discharge above the water tank.

At one side of the outer wall 11 is a lateral extension 17 closed at its bottom and sides and open at its top. The outer wall 11 is provided with an opening 18 leading to the interior of the extension 17. The upper end of the extension 17 is preferably arranged a short distance above the top of the water tank, as clearly shown in Fig. 1. Near the top of the extension 17 is a series of draft openings 19 covered by slides 20 for regulating the amount of draft.

We have provided a cover for the extension 17, which cover is indicated by the reference numeral 21, and has supported on it a gasolene tank 22. In the top of the gasolene tank 22 is mounted a valve stem 23, and in the bottom of the gasolene tank 22 is a gasolene supply pipe 24 extending through the bottom of the tank 22 and the cover 21 and extended downwardly and then laterally at 25 and provided with a burner 26. A brace 27 connects the pipe 24 with the cover 21 to firmly hold the pipe in a vertical position. The valve 23 enters the upper end of the pipe 24 and provides means for controlling the flow of gasolene into the pipe 24.

In practical use, the heater may be readily and easily placed in a water receptacle, and ordinarily there is no need of permanently securing it for the reason that the water receptacle 12 will be filled, and when thus filled, the heater will be heavier than the water and will retain its position in the water receptacle without special fastening means, although the heater may be fixed in position if desired.

When it is desired to heat water, the operator grasps the gasolene tank 22 and elevates it together with the burner 26 to position away from the heater. The size and shape of the extension 17 and the size of the opening 18 are such that the burner can readily and easily be withdrawn by an operator having the tank 22 in his hand. Then the gasolene burner may be lighted and the flame adjusted to the desired degree, and after the flame is working in the proper manner, the gasolene tank and its burner may be inserted in the heater. Water will enter the interior of the water receptacle 12 through the open-ended tubes 14 at the bottom, and the heated water will rise and flow out through the top of the water receptacle 12. The products of combustion arising from the flame will pass upwardly between the outer wall 11 and the water receptacle 12 and through the ventilating tubes 16.

One of the most desirable and important features of our invention is that the gasolene burner and its tank may be readily and easily detached from the water heater and removed from the water receptacle so that the burner may be ignited and adjusted and then placed in position in the heater. This permits of the use of a heater of comparatively small size and consequently of cheap and inexpensive construction, for it is obvious that if the heater itself were made large enough to permit the operator's hands to be inserted therein for igniting and adjusting the burner, the heater would have to be very large and consequently much more expensive.

We claim as our invention:

1. An improved tank heater, comprising a body portion having two compartments therein side by side, both being closed at their bottoms and sides to prevent the entrance of water when inserted in a watering trough or the like and also provided with an opening between them at their lower portions to provide communication between the compartments, a water heating chamber mounted in one of said compartments spaced apart from the bottom and sides thereof, means for conducting heated air between the water heating chamber and the compartment in which it is placed to a point of discharge above the level of the water in the trough in which the heater is placed, pipes communicating with the water chamber and extended through the walls of the compartment in which the water chamber is placed to permit the flow of water from the water chamber into the watering trough in which the device is placed, a gasolene supply tank designed to be supported above the compartment opposite from the water heating chamber, a pipe communicating therewith and having a lateral extension and a burner on said extension, said gasolene tank and burner being capable of movement laterally and upwardly to thereby remove the burner from its position beneath the water chamber to position within the compartment opposite the compartment that contains the water chamber and then upwardly so that the gasolene tank and burner may be readily and easily removed or replaced, and so that the burner may be ignited when removed.

2. An improved tank heater, comprising a body portion having two compartments therein, there being an opening at the lower portion thereof to communicate from one compartment to the other, a water chamber in one of said compartments spaced apart from the bottom and sides of the compartment, pipes communicating with said water chamber and extended through the walls of the body portion to permit water from the tank to enter the water chamber, means whereby heat and vapor generated in the body portion may pass upwardly around the water chamber to a point of discharge above the water chamber, said body portion being closed to prevent the entrance of water, a gasolene supply tank designed to rest on top of one side of the body portion, a pipe communicating therewith and having a lateral extension at its lower end, a burner at the end of said lateral extension, said pipe and burner being so shaped and arranged that they may be inserted in the compartment of the body portion opposite from the one in which the water tank is contained, and then extended to position under the water chamber and means whereby the said pipe and gasolene tank may be detachably supported by the body portion when the burner is in position under the water chamber, said body portion being also provided with means for admitting air to the burner.

3. An improved tank heater, comprising an outer cylinder closed at its bottom, a lateral extension on one side of the cylinder closed at its bottom and open at its top, a water receptacle arranged within the outer cylinder, provided with a closed bottom and open at its top, open-ended water tubes extended through said cylinder and water receptacle, means for closing the space between the upper end of the water receptacle and the cylinder, open-ended tubes leading upwardly from the top of said space to a point of discharge, there being an opening in the side of the cylinder adjacent to said extension, the upper end of said extension being provided with ventilating holes, a cover for the top of the said extension, a gasolene tank supported on said cover, a supply pipe connected with the gasolene tank and extended downwardly and then laterally, a burner connected therewith, and a valve rod in the top of the gasolene tank for regulating the passageway through said supply pipe, substantially as and for the purposes stated.

Des Moines, Iowa, May 7, 1909.
HAL SCOTT.
RICHARD M. BOYER.

Witnesses:
J. C. WILLIAMS,
T. H. BOYER.